US010956483B2

(12) United States Patent
Allen, Jr. et al.

(10) Patent No.: US 10,956,483 B2
(45) Date of Patent: *Mar. 23, 2021

(54) AUTOMATED DYNAMIC REPRIORITIZATION OF PRESENTATION MATERIALS

(71) Applicant: International Business Machines Corporation, Armonk, NY (US)

(72) Inventors: Lloyd W. Allen, Jr., Cary, NC (US);
Travis M. Grigsby, Seattle, WA (US);
Jana H. Jenkins, Raleigh, NC (US);
Steven M. Miller, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 140 days.

This patent is subject to a terminal disclaimer.

(21) Appl. No.: 16/001,313

(22) Filed: Jun. 6, 2018

(65) Prior Publication Data
US 2018/0285367 A1    Oct. 4, 2018

Related U.S. Application Data

(63) Continuation of application No. 14/729,785, filed on Jun. 3, 2015, now Pat. No. 10,002,133, which is a
(Continued)

(51) Int. Cl.
*G06F 16/438*   (2019.01)
*G06Q 10/10*    (2012.01)
(Continued)

(52) U.S. Cl.
CPC ........ *G06F 16/4393* (2019.01); *G06F 40/103* (2020.01); *G06Q 10/10* (2013.01); *H04L 67/10* (2013.01)

(58) Field of Classification Search
CPC ... G06Q 10/10; G06F 16/4393; G06F 40/103; H04L 67/10
See application file for complete search history.

(56) References Cited

U.S. PATENT DOCUMENTS 5,504,675 A    4/1996   Cragun et al.
5,917,480 A    6/1999   Tafoya et al.
(Continued)

OTHER PUBLICATIONS

United States Patent and Trademark Office, Office Action for U.S. Appl. No. 12/480,381, dated Oct. 28, 2011, pp. 1-14, Alexandria, VA, USA.

(Continued)

*Primary Examiner* — Nathan Hillery
(74) *Attorney, Agent, or Firm* — William H. Hartwell (57) ABSTRACT

A first selectable slide presentation priority level assigned to a slide presentation is determined responsive to detecting an indication from a user using an input device to start the slide presentation. Individual slides of the slide presentation determined to include an assigned individual slide priority level equal to or higher than the assigned first selectable slide presentation priority level are selectively presented. For each presented slide, any additional content-dependent slides with assigned individual slide priority levels lower than the assigned first selectable slide presentation priority level that are determined, according to inter-slide content dependency data, to include a user-assigned inter-slide content dependency upon content of the presented slide are selectively presented.

20 Claims, 7 Drawing Sheets

Related U.S. Application Data continuation of application No. 12/480,381, filed on Jun. 8, 2009, now Pat. No. 9,081,783.

(51) Int. Cl.
  *G06F 40/103* (2020.01)
  *H04L 29/08* (2006.01)

(56) References Cited

U.S. PATENT DOCUMENTS

| | | | |
|---|---|---|---|
| 6,008,807 | A | 12/1999 | Bretschneider et al. |
| 6,717,591 | B1 | 4/2004 | Fiveash et al. |
| 6,774,920 | B1 | 8/2004 | Cragun |
| 7,103,836 | B1 | 9/2006 | Nakamura et al. |
| 7,174,029 | B2 | 2/2007 | Agostinelli et al. |
| 7,681,144 | B2 | 3/2010 | Keereepart |
| 8,024,672 | B1 | 9/2011 | Skwarecki et al. |
| 8,041,724 | B2 | 10/2011 | Bhogal |
| 9,081,783 | B2 | 7/2015 | Allen, Jr. et al. |
| 9,619,128 | B2 | 4/2017 | Edge |
| 9,870,755 | B2 | 1/2018 | Chen |
| 9,928,242 | B2 | 3/2018 | Chaudhary |
| 2002/0126140 | A1* | 9/2002 | Gorbet ............... G06F 9/453 715/708 |
| 2002/0191013 | A1 | 12/2002 | Abrams |
| 2003/0088832 | A1 | 5/2003 | Agostinelli et al. |
| 2003/0122863 | A1 | 7/2003 | Dieberger et al. |
| 2003/0160814 | A1 | 8/2003 | Brown |
| 2003/0174160 | A1 | 9/2003 | Deutscher et al. |
| 2004/0090424 | A1 | 5/2004 | Hurley et al. |
| 2004/0113934 | A1* | 6/2004 | Kleinman ........ G06F 16/4393 715/732 |
| 2005/0052405 | A1 | 3/2005 | Maulik et al. |
| 2005/0154995 | A1 | 7/2005 | Miller et al. |
| 2005/0193323 | A1 | 9/2005 | Coulomb et al. |
| 2005/0223314 | A1 | 10/2005 | Varadarajan et al. |
| 2005/0251731 | A1 | 11/2005 | Valderas et al. |
| 2006/0020895 | A1 | 1/2006 | Keohane et al. |
| 2006/0048058 | A1* | 3/2006 | O'Neal ............... G06F 40/169 715/730 |
| 2006/0177019 | A1 | 8/2006 | Portnykh et al. |
| 2006/0288389 | A1 | 12/2006 | Deutscher et al. |
| 2007/0100938 | A1* | 5/2007 | Bagley ............... G06Q 10/10 709/204 |
| 2007/0124681 | A1 | 5/2007 | Abbar et al. |
| 2007/0162858 | A1 | 7/2007 | Hurley et al. |
| 2007/0171201 | A1 | 7/2007 | Pi et al. |
| 2007/0188520 | A1* | 8/2007 | Finley ............... G06Q 10/10 345/619 |
| 2007/0300158 | A1 | 12/2007 | Kasperkiewicz et al. |
| 2008/0022209 | A1* | 1/2008 | Lyle ............... G06Q 10/107 715/730 |
| 2008/0070218 | A1 | 3/2008 | Ahl et al. |
| 2008/0155437 | A1* | 6/2008 | Morris ............... G06F 9/451 715/765 |
| 2008/0189616 | A1 | 8/2008 | Coulomb et al. |
| 2008/0288864 | A1 | 11/2008 | Qu et al. |
| 2008/0309795 | A1 | 12/2008 | Mitsuhashi et al. |
| 2009/0044117 | A1 | 2/2009 | Vaughan et al. |
| 2009/0083113 | A1* | 3/2009 | Ortega ............ G06Q 10/06315 705/7.25 |
| 2009/0282339 | A1 | 11/2009 | Van Melle et al. |
| 2010/0031152 | A1 | 2/2010 | Villaron et al. |
| 2010/0122171 | A1 | 5/2010 | Bauchot et al. |
| 2010/0218100 | A1 | 8/2010 | Simon et al. |
| 2010/0257449 | A1* | 10/2010 | Lieb ............... G06Q 10/10 715/730 |
| 2013/0167033 | A1* | 6/2013 | Skwarecki ........ G11B 27/034 715/719 |
| 2015/0178044 | A1* | 6/2015 | Ehlen ............... G06F 3/0482 715/728 |
| 2015/0234800 | A1* | 8/2015 | Ehlen ............... G06F 16/4393 715/202 |
| 2015/0269169 | A1 | 9/2015 | Allen, Jr. et al. |

OTHER PUBLICATIONS

United States Patent and Trademark Office, Office Action for U.S. Appl. No. 12/480,381, dated Oct. 25, 2012, pp. 1-12, Alexandria, VA, USA.

United States Patent and Trademark Office, Office Action for U.S. Appl. No. 12/480,381, dated Sep. 11, 2014, pp. 1-22, Alexandria, VA, USA.

United States Patent and Trademark Office, Notice of Allowance for U.S. Appl. No. 12/480,381, dated Mar. 3, 2015, pp. 1-22, Alexandria, VA, USA.

United States Patent and Trademark Office, Supplemental Notice of Allowance for U.S. Appl. No. 12/480,381, dated Jun. 3, 2015, pp. 1-5, Alexandria, VA, USA.

United States Patent and Trademark Office, Office Action for U.S. Appl. No. 14/729,785, dated Jun. 29, 2017, pp. 1-19, Alexandria, VA, USA.

United States Patent and Trademark Office, Notice of Allowance for U.S. Appl. No. 14/729,785, dated Feb. 22, 2018, pp. 1-5, Alexandria, VA, USA.

* cited by examiner

AUTOMATED DYNAMIC REPRIORITIZATION OF PRESENTATION MATERIALS

BACKGROUND

The present invention relates to systems and methods for presentation information to groups of people. More particularly, the present invention relates to dynamic reprioritization of presentation materials.

Slide presentation systems allow a user to create a slide presentation including multiple slides. Each slide may include information on one or more topics associated with a meeting that the user plans to present to one or more people. During the meeting, the user may present the slides beginning with the first slide created and ending with the last slide created.

SUMMARY

A method includes selectively presenting slides via a slide presentation system based upon a priority level assigned to a slide presentation, where the assigned priority level indicates which of the slides to selectively present and comprises a first priority level of at least two priority levels associated with the slide presentation; receiving a request during the selective presentation of the slides via an input device associated with the slide presentation system to change the priority level assigned to the slide presentation to a second priority level of the at least two priority levels; and selectively presenting remaining slides of the slide presentation via the slide presentation system based upon the second priority level.

A system includes an input device; and a processor programmed to: selectively present slides via a display device based upon a priority level assigned to a slide presentation, where the assigned priority level indicates which of the slides to selectively present and comprises a first priority level of at least two priority levels associated with the slide presentation; receive a request during the selective presentation of the slides via the input device to change the priority level assigned to the slide presentation to a second priority level of the at least two priority levels; and selectively present remaining slides of the slide presentation via the display device based upon the second priority level.

An alternative system includes an input device; and a processor programmed to: selectively present slides via a display device based upon a priority level assigned to a slide presentation, where the assigned priority level indicates which of the slides to selectively present and comprises a first priority level of at least two priority levels associated with the slide presentation and where at least one of the at least two priority levels is associated with each slide of the slide presentation; determine that at least one of the selectively presented slides with an associated priority level equal to or higher than the first priority level shares a dependency with at least one other slide; selectively present the at least one other slide in association with the at least one of the selectively presented slides with the associated priority level equal to or higher than the first priority level via the display device; receive a request during the selective presentation of the slides via the input device to change the priority level assigned to the slide presentation to a second priority level of the at least two priority levels; determine an estimated time associated with each of a plurality of remaining slides of the slide presentation after a presently active slide within the slide presentation; determine a priority level associated with each of the plurality of remaining slides of the slide presentation after the presently active slide within the slide presentation; determine, for each of the at least two priority levels, an estimated total remaining time for completion of the slide presentation based upon the estimated time associated with each of the plurality of remaining slides associated with each of the at least two priority levels; automatically select the second priority level based upon the estimated total remaining time for completion of the slide presentation for each of the at least two priority levels that approximates the time remaining for the slide presentation; and selectively present the plurality of remaining slides of the slide presentation via the display device based upon the second priority level.

A computer program product includes a computer useable storage medium including a computer readable program. The computer readable program when executed on a computer causes the computer to: selectively present slides via a display device based upon a priority level assigned to a slide presentation, where the assigned priority level indicates which of the slides to selectively present and comprises a first priority level of at least two priority levels associated with the slide presentation; receive a request during the selective presentation of the slides via an input device to change the priority level assigned to the slide presentation to a second priority level of the at least two priority levels; and selectively present remaining slides of the slide presentation via the display device based upon the second priority level.

DETAILED DESCRIPTION

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides automated dynamic reprioritization of presentation materials. Slides and/or slide content items are assigned priority levels and may be assigned dependencies during creation of a slide presentation via a slide presentation system. One of the assigned priority levels is assigned to the presentation. During the slide presentation, slides are selectively presented based upon the priority level assigned to the slide presentation and any dependencies between slides. Based upon presentation constraints, such as starting the slide presentation late or extended questions, the user may request a change of the priority level assigned to the slide presentation. A second priority level may be automatically selected based upon a time remaining for the slide presentation or based upon a user selection. The remaining slides are selectively presented based upon the second priority level to comply with the constraints. Priorities may be textual, numeric, and/or weighted and may designate a priority level of critical, important, helpful, background, or any other suitable indication of a distinct priority level for the respective slides and the slide presentation.

The automated dynamic reprioritization of presentation materials described herein may be performed in real time to allow prompt reprioritization of presentation materials. For purposes of the present description, real time shall include any time frame of sufficiently short duration as to provide reasonable response time for information processing acceptable to a user of the subject matter described. Additionally, the term "real time" shall include what is commonly termed "near real time"—generally meaning any time frame of sufficiently short duration as to provide reasonable response time for on-demand information processing acceptable to a user of the subject matter described (e.g., within a portion of a second or within a few seconds). These terms, while difficult to precisely define are well understood by those skilled in the art.

Figure 1:
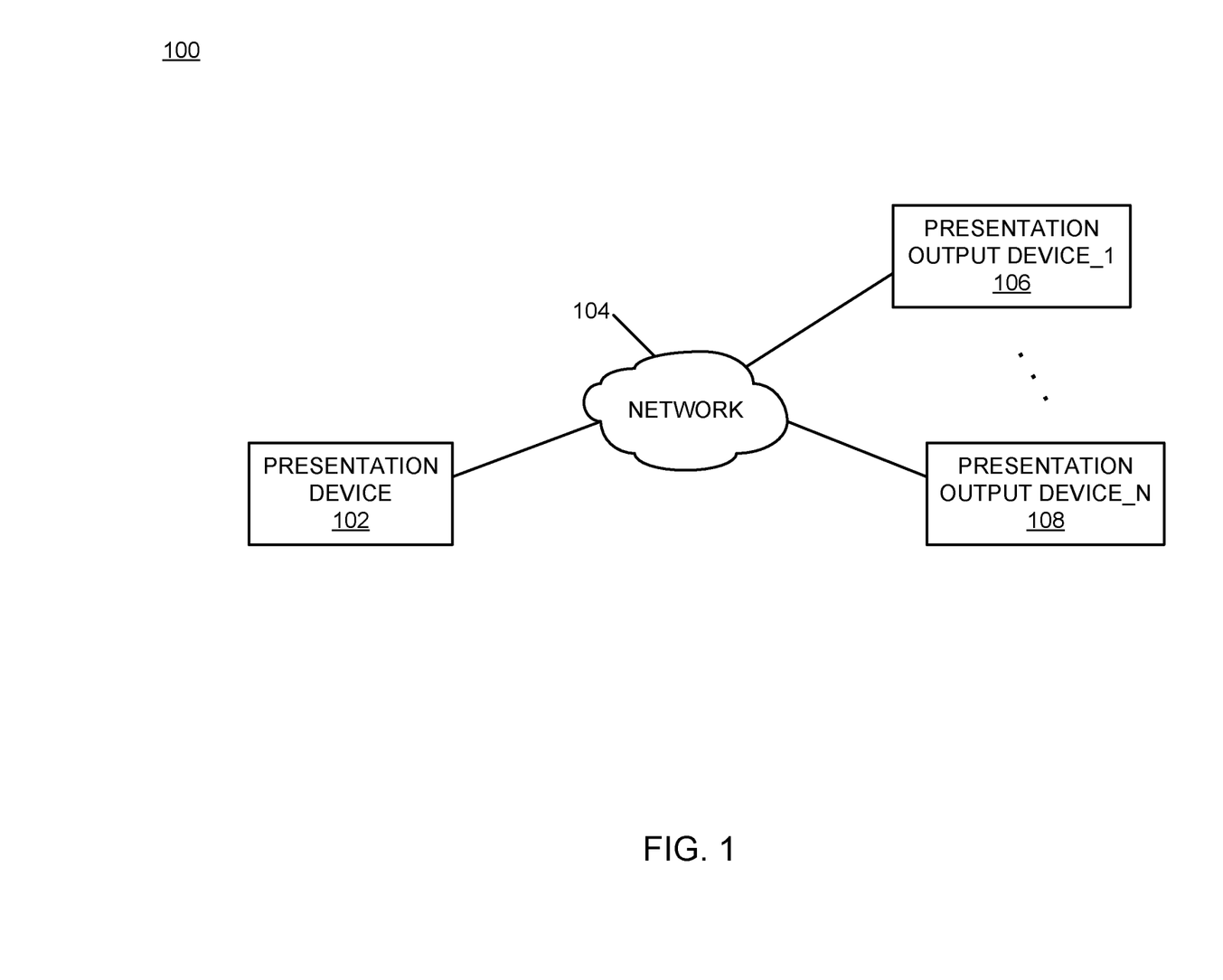
FIG. 1 is a block diagram of an example of an implementation of a system for automated dynamic reprioritization of presentation materials according to an embodiment of the present subject matter.

FIG. 1 is a block diagram of an example of an implementation of a system 100 for automated dynamic reprioritization of presentation materials. Within the system 100, a presentation device 102 is illustrated. As will be described in more detail below in association with FIGS. 2 through 6B, the presentation device 102 provides automated dynamic reprioritization of presentation materials based upon priority levels assigned to individual slides within a slide presentation and based upon priority levels assigned to the slide presentation itself. The presentation device 102 provides selective presentation of slides based upon the priority level assigned to the slide presentation and reprioritizes the slide presentation to selectively present slides at a different priority level based upon a request to change the priority level associated with the slide presentation.

The reprioritization of the slides is automatically performed in association with a time remaining for the remaining slide presentation when a specified new priority level does not accompany the request to change the priority level. The time available for the presentation of each slide within a slide presentation may change based upon circumstances outside the control of the presenter. The present subject matter provides a presenter with a capability to rapidly adjust the selectively presented content in response to these changing circumstances. The user may override the automated dynamic reprioritization of the presentation materials if the user wishes, such as when a manager or other colleague is particularly interested in content associated with a particular portion of the presented materials.

It should be noted that the presentation device 102 may be a portable computing device, either by a user's ability to move the presentation device 102 to different locations or by the presentation device 102's association with a portable platform, such as a plane, train, automobile, or other moving vehicle. It should also be noted that the presentation device 102 may be any computing device capable of processing information as described above and in more detail below. For example, the presentation device 102 may include devices such as a personal computer (e.g., desktop, laptop, palm, etc.) or a handheld device (e.g., cellular telephone, personal digital assistant (PDA), email device, music recording or playback device, etc.), or any other device capable of processing information as described in more detail below.

The presentation device 102 is interconnected via a network 104 to a presentation output device_1 106 through a presentation output device_N 108. The presentation output device_1 106 through the presentation output device_N 108 provide output for slide presentations presented by the presentation device 102 that may be accessed and viewable by participants of the presentation that are situated at physically different locations. Additionally, any of the presentation output device_1 106 through the presentation output device_N 108 may be situated in a meeting room for viewing by multiple persons concurrently.

The network 104 includes any form of interconnection suitable for the intended purpose, including a private or public network such as an intranet or the Internet, respectively, direct inter-module interconnection, dial-up, wireless, or any other interconnection mechanism capable of interconnecting the devices with the network 104.

The presentation output device_1 106 through the presentation output device_N 108 may include a retractable or stationary wall-mounted display device, a projection device capable of projecting images on a wall or screen, a display device located at each of a group of seats within a seating area, a display coupled to a computing device, or any other display element capable of presenting information to multiple people concurrently As such, the presentation output device_1 106 through the presentation output device_N 108 represent any form of output device suitable for use in association with the present subject matter.

Figure 2:
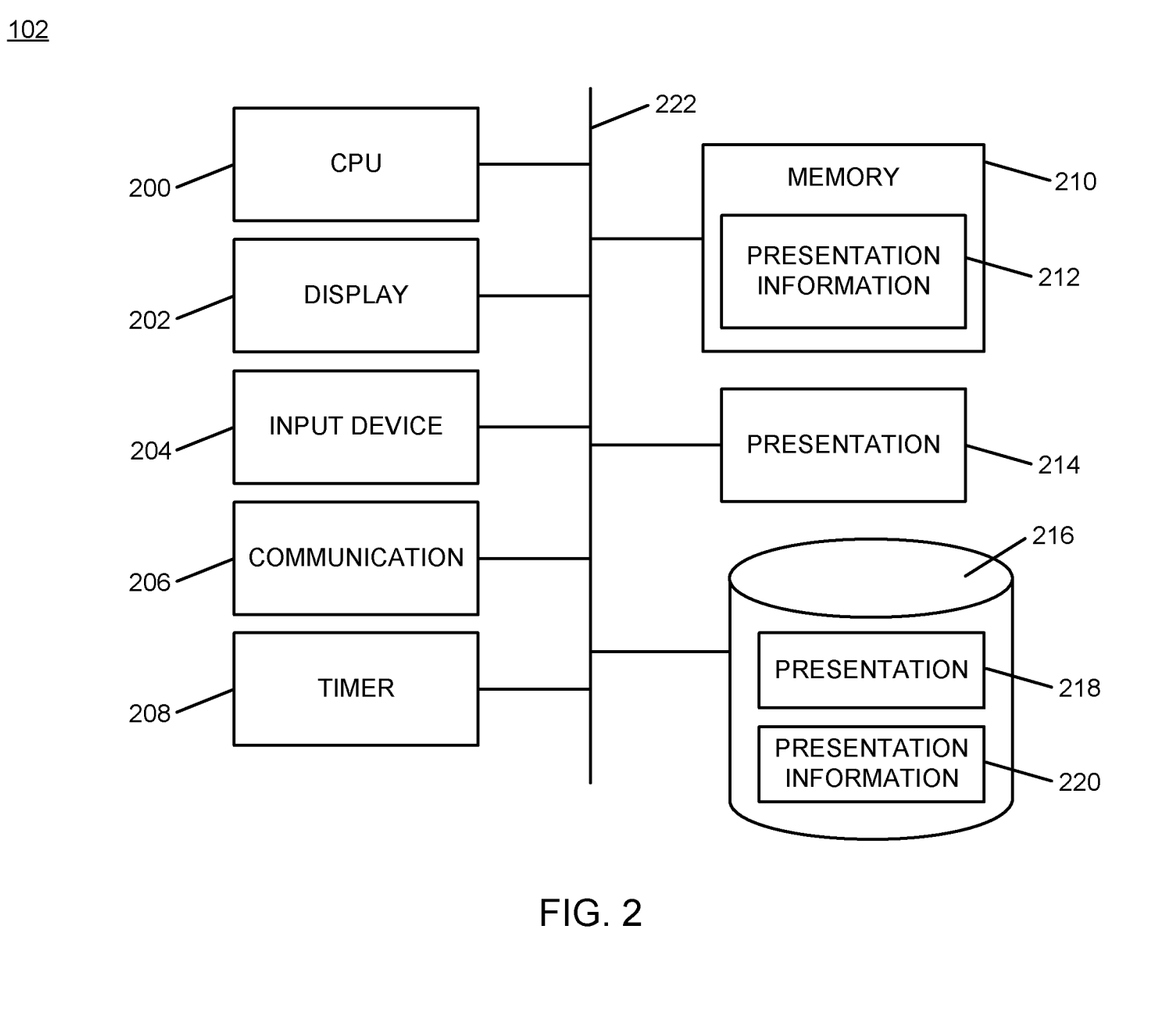
FIG. 2 is a block diagram of an example of an implementation of a presentation device that is capable of performing automated dynamic reprioritization of presentation materials according to an embodiment of the present subject matter.

FIG. 2 is a block diagram of an example of an implementation of the presentation device 102 that is capable of performing automated dynamic reprioritization of presentation materials. A central processing unit (CPU) 200 provides computer instruction execution, computation, and other capabilities within the presentation device 102. A display 202 provides visual information to a user of the presentation device 102 and an input device 204 provides input capabilities for the user.

The display 202 may include any display device, such as a cathode ray tube (CRT), liquid crystal display (LCD), light emitting diode (LED), projection, touchscreen, or other display element or panel. The display 202 may also include a retractable or stationary wall-mounted display device, a projection device capable of projecting images on a wall or screen, a display device located at each of a group of seats within a seating area, or any other display element capable of presenting information to multiple people concurrently. The input device 204 may include a computer keyboard, a keypad, a mouse, a pen, a joystick, or any other type of input device by which the user may interact with and respond to information on the display 202.

A communication module 206 provides interconnection capabilities that allow the presentation device 102 to communicate with other modules within the system 100, such as the presentation output device_1 106 through the presentation output device_N 108, to display content associated with a slide presentation. The communication module 206 may include any electrical, protocol, and protocol conversion capabilities useable to provide the interconnection capabilities. Though the communication module 206 is illustrated as a component-level module for ease of illustration and description purposes, it should be noted that the communication module 206 may include any hardware, programmed processor(s), and memory used to carry out the functions of the communication module 206 as described above and in more detail below. For example, the communication module 206 may include additional controller circuitry in the form of application specific integrated circuits (ASICs), processors, antennas, and/or discrete integrated circuits and components for performing communication and electrical control activities associated with the communication module 206. Additionally, the communication module 206 may include interrupt-level, stack-level, and application-level modules as appropriate. Furthermore, the communication module 206 may include any memory components used for storage, execution, and data processing for performing processing activities associated with the communication module 206. The communication module 206 may also form a portion of other circuitry described without departure from the scope of the present subject matter.

A timer 208 provides timing capabilities for the presentation device 102. The presentation device 102 utilizes the timer 208 during slide presentation rehearsal activities to establish estimated presentation times for individual slides and for slides at each of multiple priority levels associated with a slide presentation. The presentation device 102 also utilizes the timer 208 during presentation of the slide presentation materials in response to requests to reprioritize slides within the slide presentation based upon events associated with a time remaining for presentation of the slides. As described above, a presenter may start a presentation late if a previous presenter overruns a designated timeslot. Additionally, a presenter may receive a larger than expected number of questions regarding one or more slides associated with a slide presentation. Many other factors may influence a user to request that the presentation device 102 reprioritize slides associated with a slide presentation and all are considered within the scope of the present subject matter.

A memory 210 includes a presentation information storage area 212 that stores information associated with, for example, a time remaining for a slide presentation. The time remaining may be adjusted either positively or negatively based upon circumstances associated with a presentation.

It is understood that the memory 210 may include any combination of volatile and non-volatile memory suitable for the intended purpose, distributed or localized as appropriate, and may include other memory segments not illustrated within the present example for ease of illustration purposes. For example, the memory 210 may include a code storage area, a code execution area, and a data area without departure from the scope of the present subject matter.

A presentation module 214 provides the automated dynamic reprioritization of presentation materials for the presentation device 102, as described above and in more detail below. Though the presentation module 214 is illustrated as a component-level module for ease of illustration and description purposes, it should be noted that the presentation module 214 may include any hardware, programmed processor(s), and memory used to carry out the functions of the presentation module 214 as described above and in more detail below. For example, the presentation module 214 may include additional controller circuitry in the form of application specific integrated circuits (ASICs), processors, and/or discrete integrated circuits and components for performing communication and electrical control activities associated with the presentation module 214. Additionally, the presentation module 214 may also include interrupt-level, stack-level, and application-level modules as appropriate. Furthermore, the presentation module 214 may include any memory components used for storage, execution, and data processing for performing processing activities associated with the presentation module 214. The presentation module 214 may also form a portion of other circuitry described without departure from the scope of the present subject matter.

A database 216 is associated with the presentation device 102 and provides storage capabilities for information associated with the automated dynamic reprioritization of presentation materials of the presentation device 102. The database 216 includes a presentation storage area 218 and a presentation information storage area 220 that may be stored in the form of tables or other arrangements accessible by the presentation device 102. The presentation storage area 218 includes storage for slide presentations developed using and presented by the presentation device 102. The presentation information storage area 220 includes additional information associated with the slide presentations, such as assigned priorities for slides and slide presentations, and any additional information that may be useable based upon the present subject matter. The information stored within the presentation information storage area 220 may be stored in the form of metadata associated with slides and/or slide presentations. Additionally, metadata associated with slides and/or slide presentations may be stored within the presentation storage area 218 without departure from the scope of the present subject matter.

The CPU 200, the display 202, the input device 204, the communication module 206, the timer 208, the memory 210, the presentation module 214, and the database 216 are interconnected via an interconnection 222. The interconnection 222 may include a system bus, a network, or any other interconnection capable of providing the respective components with suitable interconnection for the respective purpose.

While the presentation device 102 is illustrated with and has certain components described, other modules and components may be associated with the presentation device 102 without departure from the scope of the present subject matter. Additionally, it should be noted that, while the presentation device 102 is described as a single device for ease of illustration purposes, the components within the presentation device 102 may be co-located or distributed and interconnected via a network without departure from the scope of the present subject matter. For a distributed arrangement, the display 202 and the input device 204 may be located at a point of sale device, kiosk, or other location, while the CPU 200 and memory 210 may be located at a local or remote server. Many other possible arrangements for components of the presentation device 102 are possible and all are considered within the scope of the present subject matter. It should also be understood that, though the presentation storage area 218 and the presentation information storage area 220 are shown within the database 216, they may also be stored within the memory 210 without departure from the scope of the present subject matter. Accordingly, the presentation device 102 may take many forms and may be associated with many platforms.

FIG. 3 through FIG. 6B below describe example processes that may be executed by presentation devices, such as the presentation device 102, to perform the automated dynamic reprioritization of presentation materials associated with the present subject matter. Many other variations on the example processes are possible and all are considered within the scope of the present subject matter. The example processes may be performed by modules, such as the presentation module 214 and/or executed by the CPU 200, associated with presentation devices. It should be noted that time out procedures and other error control procedures are not illustrated within the example processes described below for ease of illustration purposes. However, it is understood that all such procedures are considered to be within the scope of the present subject matter.

Figure 3:
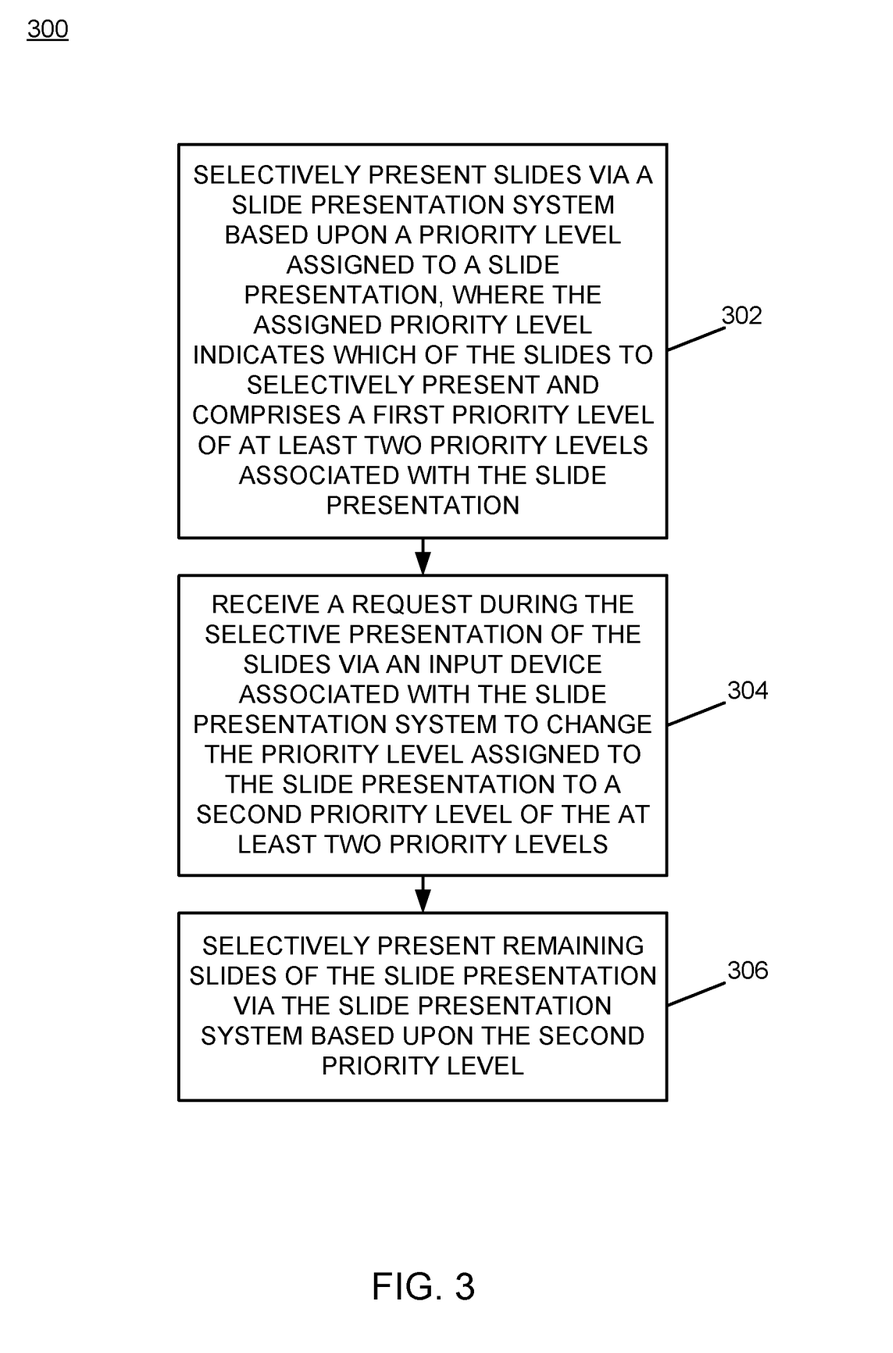
FIG. 3 is a flow chart of an example of an implementation of a process for automated dynamic reprioritization of presentation materials according to an embodiment of the present subject matter.

FIG. 3 is a flow chart of an example of an implementation of a process 300 for automated dynamic reprioritization of presentation materials. At block 302, the process 300 selectively presents slides via a slide presentation system based upon a priority level assigned to a slide presentation, where the assigned priority level indicates which of the slides to selectively present and comprises a first priority level of at least two priority levels associated with the slide presentation. At block 304, the process 300 receives a request during the selective presentation of the slides via an input device associated with the slide presentation system to change the priority level assigned to the slide presentation to a second priority level of the at least two priority levels. At block 306, the process 300 selectively presents remaining slides of the slide presentation via the slide presentation system based upon the second priority level.

Figure 4:
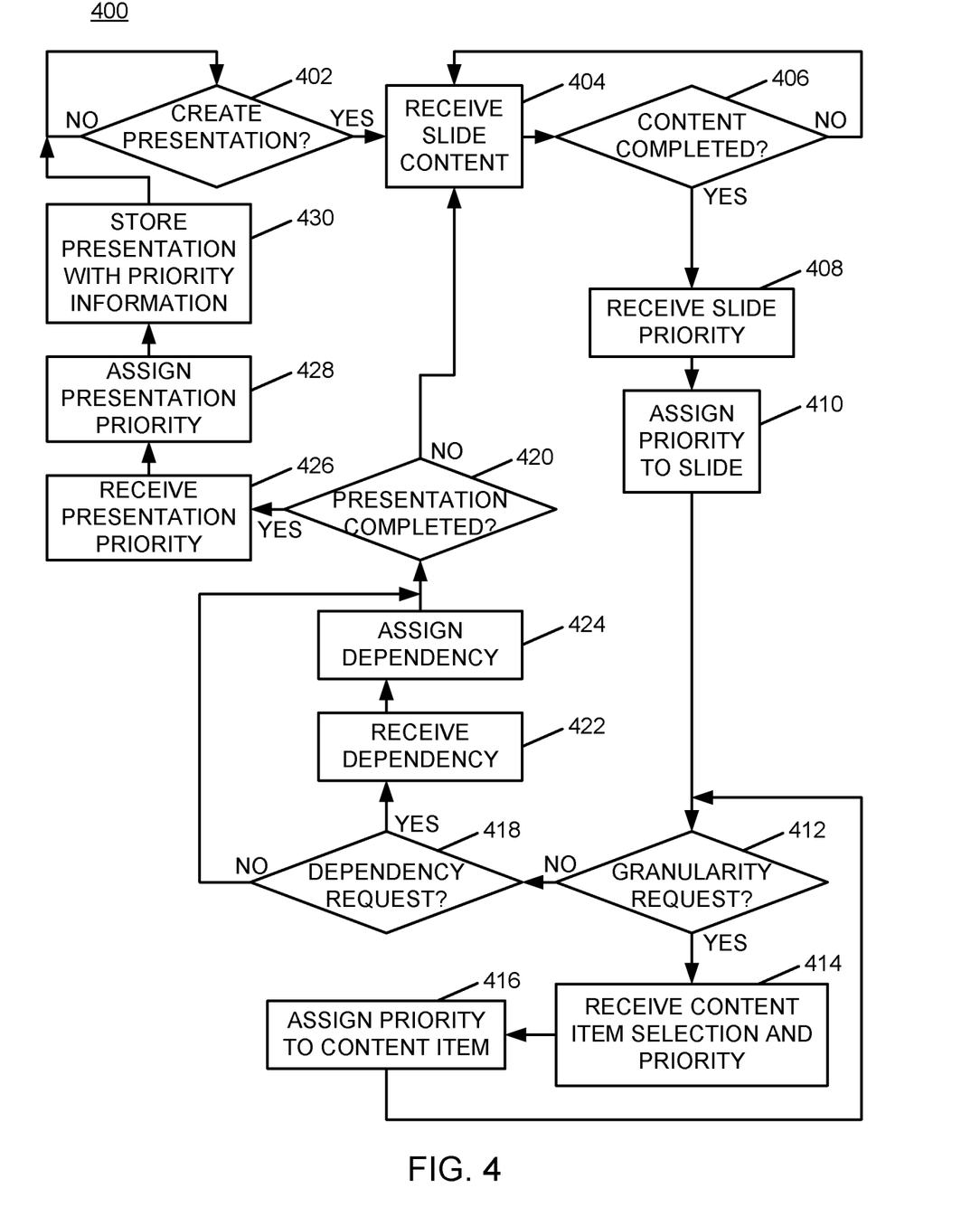
FIG. 4 is a flow chart of an example of an implementation of a process for presentation creation to implement automated dynamic reprioritization of presentation materials, via a slide presentation device, to assign priorities to slides, portions of slides, and slide presentations according to an embodiment of the present subject matter.

FIG. 4 is a flow chart of an example of an implementation of a process 400 for presentation creation to implement automated dynamic reprioritization of presentation materials via a slide presentation device, such as the presentation device 102, to assign priorities to slides, portions of slides, and slide presentations. The process 400 waits at decision point 402 for an indication to create a presentation. The indication to create the presentation may be received, for example, from a user of the presentation device 102 via the input device 204. Upon receipt of the indication to create the presentation, the process 400 receives slide content at block 404. It is understood that receiving the slide content may be performed in response to prompting the user via the display 202 to enter the content for the slide. For ease of illustration purposes, this additional processing is not illustrated within FIG. 4. However, it is understood that such additional processing may be associated with the process 400 without departure from the scope of the present subject matter in association with receipt of any user input via the input device 204. It is also understood that receipt of the slide content may be an iterative process where the user repeatedly interacts with the input device 204 to enter the slide content.

At decision point 406, the process 400 makes a determination as to whether the content has been completed for the slide being created. As with other determinations based upon user input, the determination as to whether the content has been completed may also be made based upon user input via the input device 204. Upon determining that the content has not been completed, the process 400 returns to block 404 to receive additional slide content.

When a determination is made that the content for the slide being created has been completed, the process 400 receives a slide priority from the user via the input device 204 at block 408. As described above, receiving the slide priority may be performed in response to prompting the user via the display 202 to enter the priority for the slide. For ease of illustration purposes, this additional processing is not illustrated within FIG. 4. However, it is understood that such additional processing may be associated with the process 400 without departure from the scope of the present subject matter in association with receipt of any user input via the input device 204. At block 410, the process 400 assigns the received priority to the slide.

At decision point 412, the process 400 makes a determination as to whether there has been a granularity request associated with the completed slide. For example, a user may individually select items that are associated with the completed slide and displayed on the display 202, via the input device 204, such as via a right mouse click. A pop-up menu may be presented that provides the user with options for slide creation in association with the automated dynamic reprioritization of presentation materials described. As such, individual items of content associated with the completed slide may be assigned different priority levels in a granular fashion.

When a determination is made that a granularity request has been received, the process 400 receives a content item selection and a priority to associate with that content item selection at block 414. As described above, the user may be prompted via the display 202 to input the received content item selection and associated priority via the input device 204. At block 416, the process 400 assigns the priority to the selected content item and returns to decision point 412 to determine whether an additional granularity request is received. The process 400 may iterate between receiving and assigning different priority levels to items of content associated with the completed slide until the user indicates, via the input device 204, that the user has completed granularity-based priority assignments associated with the content of the completed slide.

When a determination is made at decision point 412 that there is no granularity request or when all granularity-based priority assignments have been completed, the process 400 makes a determination at decision point 418 as to whether there has been a dependency request. As described above, slides within a slide presentation may be assigned dependencies. Slides and content associated with the slides upon which other slides depend may be presented either before or after the dependent slides. In such a situation, the automated dynamic reprioritization of presentation materials may consider slide dependencies in addition to priorities assigned to individual slides to perform the automated dynamic reprioritization of presentation materials.

When a determination is made at decision point 418 that there is no dependency request, the process 400 makes a determination at decision point 420 as to whether the presentation has been completed. It should be understood that, for the first completed slide, there is no other slide with which to create a dependent relationship. However, for subsequent processing, dependencies may be established. As such, for a first completed slide, the determination at decision point 418 may be bypassed and a determination may be made at decision point 420 as to whether the presentation has been completed.

When a determination has been made at decision point 420 that the presentation has not been completed, the process 400 returns to decision point 404 to iterate as described above to create additional slides. Returning to the description of decision point 418, when a determination is made that a dependency request has been received, the process 400 receives dependency information, such as an association between slides, at block 422. As with other processing steps, the user may be prompted via the display 202 to enter information via the input device 204 so that the process 400 may receive the dependency information. At block 424, the process 400 assigns the received dependency information to the associated slides and continues processing as described above and below in association with decision point 420.

When a determination is made at decision point 420 that the presentation is completed, the process 400 receives a presentation priority at block 426. The process 400 assigns the presentation priority to the completed presentation at block 428. At block 430, the process 400 stores the presentation with the assigned priority and returns to decision point 402 to await an indication to create a new presentation. As with other priority information, the priority information received and assigned in association with the process 400 may be assigned as metadata and stored within the presentation information storage area 220 or other suitable storage location.

As such, the process 400 receives slide content and creates slides for a slide presentation. The process 400 also receives and assigns priority levels to slides and to portions of content associated with slides in a created slide presentation. The process 400 receives and assigns dependency information between created slides and receives and assigns a priority to the created presentation.

Figure 5:
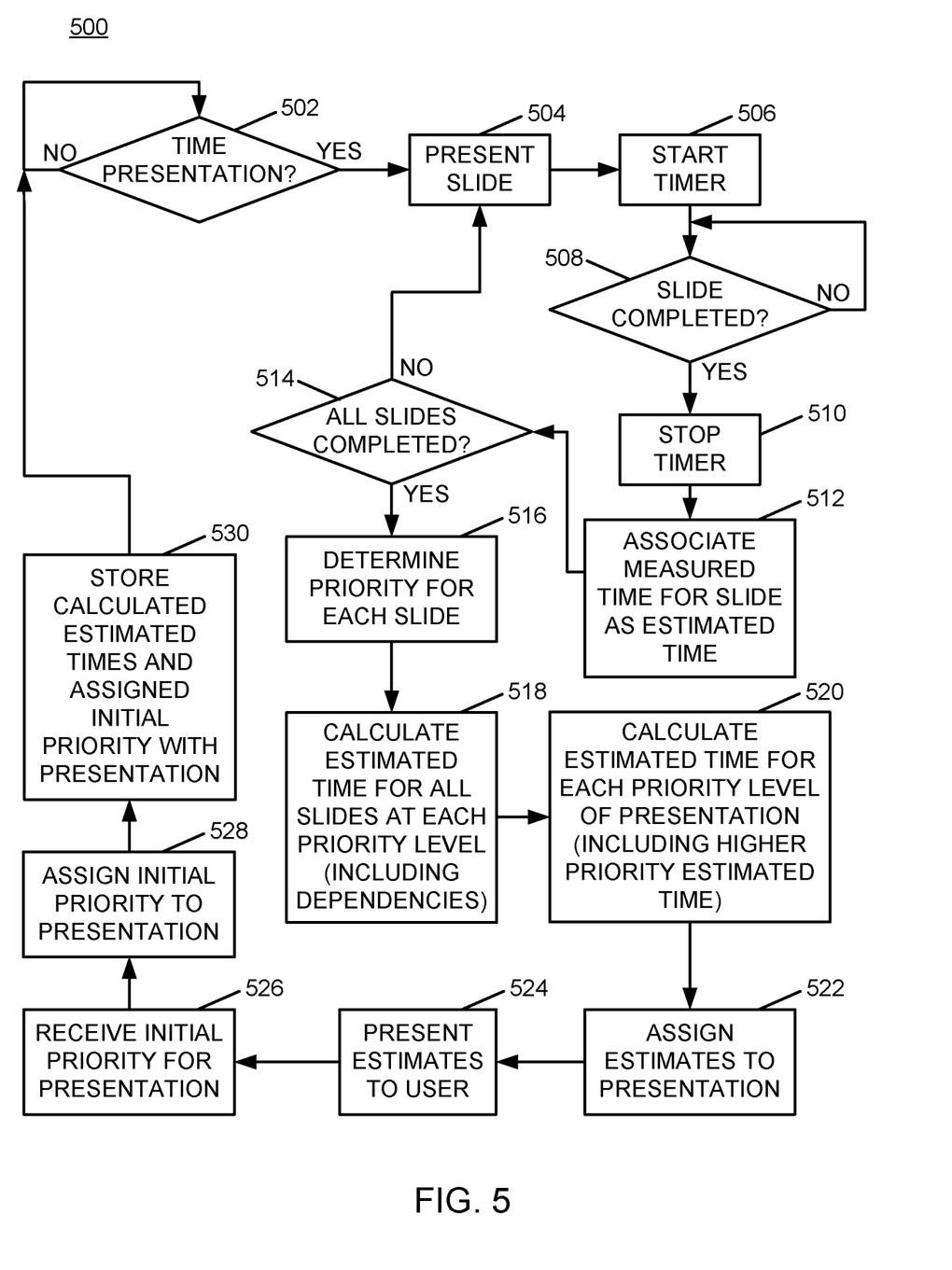
FIG. 5 is a flow chart of an example of an implementation of a process for allowing a user to rehearse a created presentation and to acquire timing information for use in association with the automated dynamic reprioritization of presentation materials according to an embodiment of the present subject matter.

FIG. 5 is a flow chart of an example of an implementation of a process 500 for allowing a user to rehearse a created presentation and to acquire timing information for use in association with the automated dynamic reprioritization of presentation materials. At decision point 502, the process 500 waits for an indication to time a presentation. The indication to time a presentation may be received, for example, from a user via the input device 204 or via any other suitable operation. When a determination is made that an indication to time a presentation has been received, the process 500 presents a first slide of a presentation to the user at block 504. As with other processing described above, the slide may be presented to the user via the display 202 or may be displayed via any of the presentation output device_1 106 through the presentation output device_N 108, as appropriate for the given situation.

At block 506, the process 500 starts a timer, such as the timer 208. At decision point 508, the process 500 makes a determination as to whether the rehearsal of the slide has been completed. The determination as to whether the rehearsal of the slide has been completed may be received, for example, from the user via the input device 204. This processing allows a user to rehearse presentation of the presented slide and allows for a different duration to be associated with each slide within a slide presentation. As such, the process 500 receives a request via an input device, such as the input device 204, to measure an amount of time for presentation of each slide of the slide presentation. For ease of illustration purposes, additional processing to allow a user to request via the input device 204 to restart the timer 208 for rehearsal of any particular slide is not illustrated. However, it is understood that any such processing is considered within the scope of the present subject matter.

When a determination is made at decision point 508 that the rehearsal of the slide has been completed, the process 500 stops the timer at block 510. At block 512, the process 500 determines a measured time for the slide via the timer 208 and associates the measured time for the slide as an estimated time for the slide.

At decision point 514, the process 500 determines whether all slides have been completed. As with other processing described, this determination may be made based upon input from a user received via the input device 204 in response to a prompt displayed on the display 202 or via any other suitable approach. When a determination is made that all slides have not been completed, the process 500 returns to block 504 and presents a next slide in the slide presentation and iterates as described above for each slide until a determination is made at decision point 514 that all slides have been completed.

When a determination is made that all slides have been completed, the process 500 determines a priority for each slide at block 516. The priority may be read as metadata associated with each slide from a storage location, such as the presentation information storage area 220 or other suitable storage location. At block 518, the process 500 calculates an estimated time for all slides at each priority level, including any dependencies that may exist between slides. At block 520, the process 500 calculates an estimated time for each priority level of the presentation, including any estimated time for higher priority level slides. At block 522, the process 500 assigns the calculated estimates to the presentation. At block 524, the process 500 presents the estimates to the user, such as via the display 202 or one or more of the presentation output device_1 106 through the presentation output device_N 108.

At block 526, the process 500 receives an initial priority level for the presentation from the user via the input device 204 and assigns the initial priority level to the presentation at block 528. At block 530, the process 500 stores the presentation with the calculated estimated times and the assigned initial priority and returns to decision point 502 to await an indication to time a presentation. The calculated estimated times and the assigned initial priority may be stored as metadata within the presentation information storage area 220 or any other suitable storage location.

As such, the process 500 receives a request via the input device 204 to measure an amount of time for presentation of each slide of the slide presentation. The process 500 initiates the slide presentation and allows a user to present the slides via a display device, such as the display 202, associated with the slide presentation system in response to inputs received via the input device 204. The process 500 measures the amount of time for presentation of each slide of the slide presentation and associates an estimated time with each slide of the slide presentation based upon the measured amount of time for presentation of each slide.

Figure 6A:
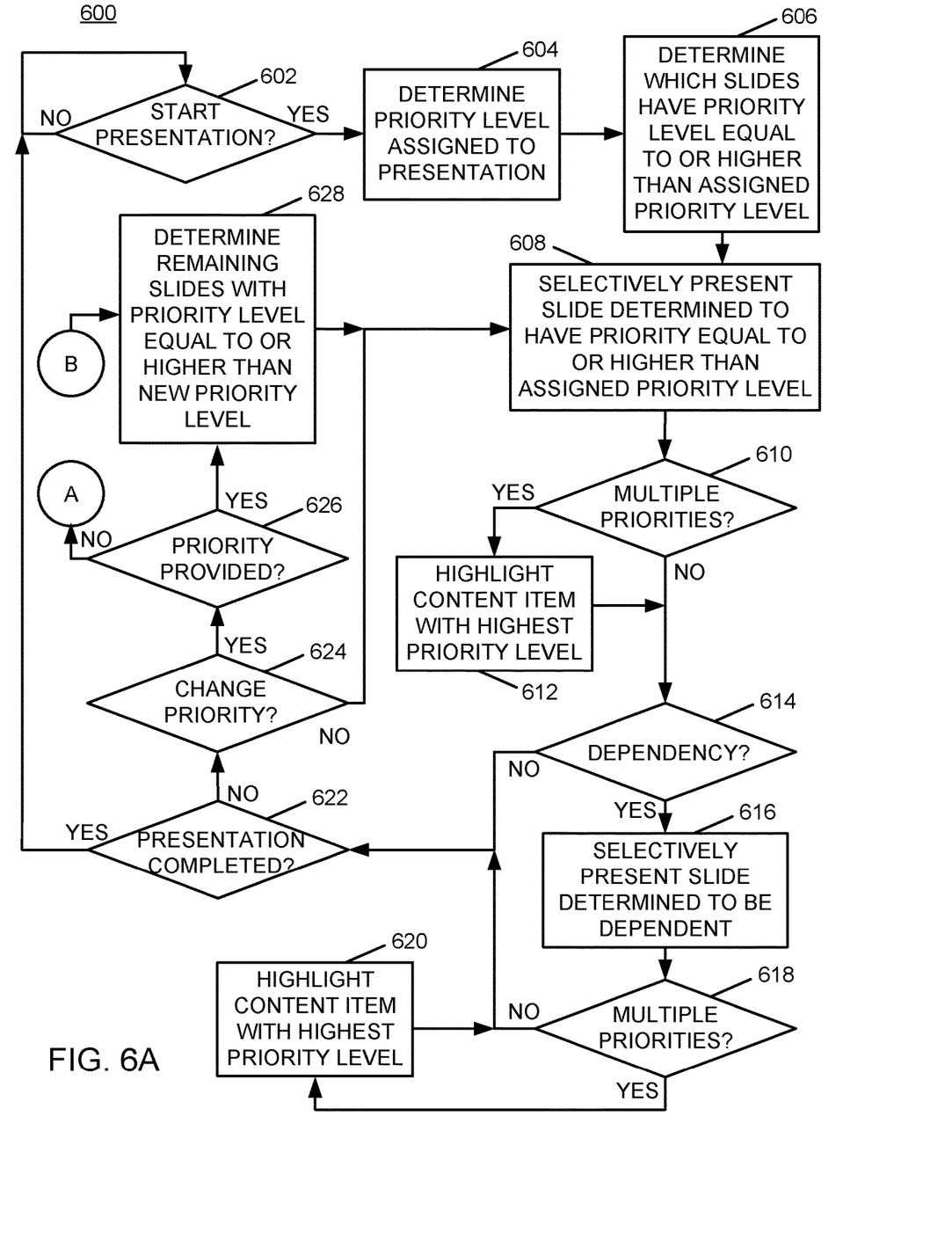
FIG. 6A is a flow chart of an example of an implementation of initial processing within a process that may be executed by a presentation device during a slide presentation to provide automated dynamic reprioritization of presentation materials according to an embodiment of the present subject matter.
Figure 6B:
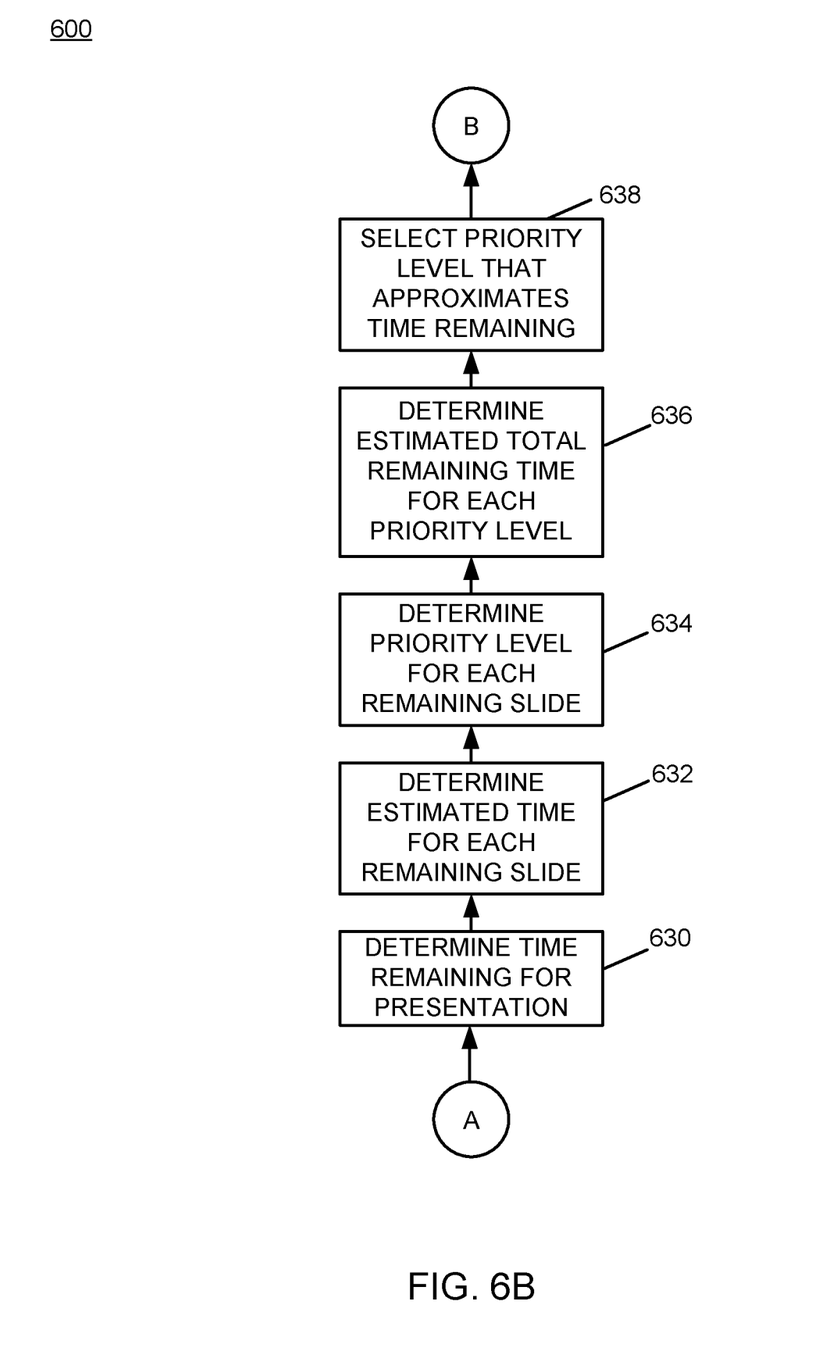
FIG. 6B is a flow chart of an example of an implementation of additional processing associated with the process beginning in FIG. 6A that may be executed by the presentation device during the slide presentation to provide automated dynamic reprioritization of presentation materials according to an embodiment of the present subject matter.

FIG. 6A and FIG. 6B illustrate a flow chart of an example of an implementation of a process 600 that may be executed by the presentation device 102 during a slide presentation to provide automated dynamic reprioritization of presentation materials. FIG. 6A illustrates initial processing within the process 600. At decision point 602, the process 600 waits for an indication to start a presentation. As with other processing described above, the indication to start the presentation may be received from a user via the input device 204 or any other appropriate source. For purposes of the present example, it is assumed that the slide presentation to be presented has already been selected and loaded from memory, such as the presentation storage area 218 within the database 216 or from the memory 210.

When a determination is made that an indication to start the presentation has been received, the process 600 determines a priority level assigned to the presentation at block 604. As described above, the priority level may be assigned to the presentation via metadata associated with the presentation or by any other suitable association mechanism and may be stored within the presentation information storage area 220 or other suitable storage location. At block 606, the process 600 determines which of the slides associated with the presentation have an associated priority level equal to or higher than the determined priority level assigned to the presentation. At block 608, the process 600 selectively presents a first slide of the presentation determined to have the associated priority level equal to or higher than the assigned priority level.

At decision point 610, the process 600 makes a determination as to whether multiple priorities are associated with the present slide. For example, the process 600 may determine that the present slide comprises a content item associated with the assigned priority for the presentation and an additional content item associated with either a lower or a higher priority level. When a determination is made that multiple priorities are associated with content on the present slide, the process 600 highlights the content item with the highest priority level at block 612. It should be understood that the process 600 may alternatively highlight the content associated with the priority level assigned to the presentation or utilize an alternative selective highlighting approach without departure from the scope of the present subject matter.

When a determination is made that multiple priorities are not associated with the present slide at decision point 610 or upon completion of any associated highlighting of a content item at block 612, the process 600 makes a determination at decision point 614 as to whether there is a dependency associated with the present slide. When a determination is made that a dependency relationship has been established between two slides, the process 600 selectively presents a slide determined to be dependent upon the present slide at block 616.

As with the processing described above, at decision point 618, the process 600 makes a determination as to whether multiple priorities are associated with content in the slide that has been selectively presented based upon any established dependency information. When a determination is made that multiple priorities are associated with the content, the process 600 highlights the content item with the highest priority level at block 620. As described above, it should be understood that the process 600 may alternatively highlight the content associated with the priority level assigned to the presentation or utilize an alternative selective highlighting approach without departure from the scope of the present subject matter.

When a determination is made that multiple priorities are not associated with the present slide at decision point 618, upon completion of highlighting any content at block 620, or upon making a determination at decision point 614 that there is no dependency associated with a presented slide, the process 600 makes a determination at decision point 622 as to whether the presentation is completed. The determination as to whether the presentation has been completed may be based upon completion of selectively presenting the last slide in the presentation, upon receipt of a user input via the input device 204 indicating a stop to the presentation, or upon any other suitable indication.

When a determination is made that the presentation is not completed, the process 600 makes a determination at decision point 624 as to whether there has been a change in priority associated with the presentation. The determination as to whether there has been a change in priority may be associated with receipt of an indication from the user via the input device 204 to change the priority associated with the presentation. As described above, the user may select, via the input device 204, the initial priority associated with the presentation and may change the priority level based upon circumstances associated with presentation time constraints or other constraints. For example, the user may start the presentation late due to a previous presenter overrunning their respective time slot for presenting their materials. Additionally, questions from audience members associated with a particular slide may result in the speaker running short on time for their presentation. As such, the user may request via the input device 204 to change the priority associated with the presentation. Alternatively, the process 600 may time the presentation via the timer 208 and automatically determine that time is running out for the slide presentation. In such a situation, the process 600 may automatically indicate that a change is requested. This option may be configured for a presentation and stored as metadata within the presentation information storage area 220 or other suitable storage location. This additional processing is not illustrated in association with the previous processes or the process 600 for ease of illustration purposes. However, it is understood that such additional processing is within the scope of the present subject matter.

When a determination is made at decision point 624 that the priority associated with the presentation has not been changed, the process 600 returns to block 608 to selectively present the next slide determined to have a priority equal to or higher than the assigned priority level. When a determination is made at decision point 624 that a change of priority has been requested or automatically requested, as described above, the process 600 makes a determination at decision point 626 as to whether a priority has been provided in association with the request to change the priority level. As described above, the user may provide a requested priority level change to a specified priority level or may request that the presentation device 102 automatically select a priority level based upon presentation constraints, such as the time remaining for the presentation.

When a determination is made that a priority has been provided in association with the priority change request, the process 600 determines which of the remaining slides of the slide presentation have an associated priority level equal to or higher than the requested new priority level provided at block 628 and returns to block 608 to selectively present the remaining slides determined to have a priority level equal to or higher than the new assigned priority level and to iterate as described above.

When a determination is made at decision point 626 that a priority has not been provided, the process 600 determines that it has either received a request via the input device 204 to automatically select a new priority level based upon a time value indicative of a time remaining for the slide presentation or that the process 600 has automatically timed the presentation and determined that time is running out for completion of the presentation. In either situation, the process 600 transitions and continues processing as illustrated in FIG. 6B.

FIG. 6B illustrates additional processing associated with the process 600 for automated dynamic reprioritization of presentation materials. At block 630, the process 600 determines a time remaining for the presentation. The time remaining for the presentation may be determined based upon values associated with the timer 208 or may have been received via the input device 204. At block 632, the process 600 determines an estimated time associated with each of the remaining slides of the slide presentation after the presently active slide. At block 634, the process 600 determines a priority level associated with each of the remaining slides of the slide presentation after the presently active slide. At block 636, the process 600 determines an estimated total time remaining for completion of the slide presentation for each priority level based upon the estimated time associated with each of the remaining slides and their respective priority level assignments. At block 638, the process 600 automatically selects a priority level that approximates the time remaining for the slide presentation based upon the estimated total remaining time for completion of the slide presentation for each of the assigned priority levels. The process 600 then returns to block 628 and continues processing as described above and illustrated in FIG. 6A.

The process 600 continues to iterate to selectively present slides determined to have a priority level equal to or higher than the automatically assigned priority level until either the presentation is completed or additional priority changes are requested. When a determination is made at decision point 622 that a slide presentation is completed, the process 600 returns to decision point 602 to await a request to start a new presentation. As such, the process 600 selectively presents slides based on a priority level assigned to a presentation, including highlighting for multiple-priority content on any given slide and any associated dependencies. The process 600 performs additional processing in response to requests, either received or internally generated based upon a designated time for a presentation, to change the assigned priority level. The request to change the priority level may include a requested new priority level and the process 600 may automatically select a new priority level based upon a time remaining for the slide presentation when a new priority level is not provided.

As described above in association with FIGS. 1 through 6B, the example systems and processes provide automated dynamic reprioritization of presentation materials. Many other variations and additional activities associated with automated dynamic reprioritization of presentation materials are possible and all are considered within the scope of the present subject matter.

Those skilled in the art will recognize, upon consideration of the above teachings, that certain of the above examples are based upon use of a programmed processor such as the CPU 200. However, the invention is not limited to such exemplary embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
by a slide presentation system:
  determining, responsive to detecting an indication from a user via an input device to start a slide presentation, a first selectable slide presentation priority level assigned to the slide presentation; and
  selectively presenting individual slides of the slide presentation determined to comprise an assigned individual slide priority level equal to or higher than the assigned first selectable slide presentation priority level, and for each presented slide:
    selectively presenting any additional content-dependent slides with assigned individual slide priority levels lower than the assigned first selectable slide presentation priority level that are determined, according to inter-slide content dependency data, to comprise a user-assigned inter-slide content dependency upon content of the presented slide.

2. The method of claim 1, further comprising the slide presentation system:
  selectively presenting, responsive to a request from the user to change the assigned first selectable slide presentation priority level to a second selectable slide presentation priority level, additional remaining slides of the slide presentation that comprise the assigned individual slide priority level equal to or higher than the second selectable slide presentation priority level, and for each presented additional remaining slide:
    selectively presenting any additional content-dependent remaining slides with the assigned individual slide priority levels lower than the assigned first selectable slide presentation priority level that are determined, according to the inter-slide content dependency data, to comprise the user-assigned inter-slide content dependency upon content of any presented additional remaining slide.

3. The method of claim 1, where selectively presenting any additional content-dependent slides with the assigned individual slide priority levels lower than the assigned first selectable slide presentation priority level that are determined, according to the inter-slide content dependency data, to comprise the user-assigned inter-slide content dependency upon the content of the presented slide comprises the slide presentation system:

selectively presenting the additional content-dependent slides one of before or after the respective presented slides with the assigned individual slide priority level equal to or higher than the assigned first selectable slide presentation priority level.

4. The method of claim 1, further comprising the slide presentation system:

highlighting, for at least one presented slide, at least one content item in response to determining that the at least one content item comprises a higher assigned priority level relative to the priority level assigned to the respective presented slide.

5. The method of claim 1, further comprising the slide presentation system:

determining, for at least one presented slide, that at least one additionally presented slide that comprises the user-assigned inter-slide content dependency upon the content of the presented slide comprises multi-priority content; and highlighting at least one content item of the multi-priority content in response to determining that the at least one content item comprises a higher assigned priority level relative to the priority level assigned to the at least one presented slide.

6. The method of claim 1, further comprising the slide presentation system:

receiving a request via the input device to measure an amount of time for presentation of each slide of the slide presentation;

measuring the amount of time for presentation of each slide of the slide presentation; and associating an estimated time with each slide of the slide presentation based upon the measured amount of time for presentation of each slide.

7. The method of claim 1, further comprising the slide presentation system:

receiving a request via the input device to automatically select a second selectable slide presentation priority level based upon a time value indicative of a time remaining for the slide presentation;

determining, for each selectable slide presentation priority level, an estimated total remaining time for completion of the slide presentation based upon an estimated time associated with each remaining slide associated with each of the selectable slide presentation priority levels plus an estimated time of any of the slides upon which any remaining slides are dependent; and automatically selecting the second selectable slide presentation priority level in accordance with the estimated total remaining time for completion of the slide presentation for each of the selectable slide presentation priority levels that approximates the time remaining for the slide presentation.

8. A system, comprising:
an input device; and
a processor programmed to:
determine, responsive to detecting an indication from a user via the input device to start a slide presentation, a first selectable slide presentation priority level assigned to a slide presentation; and selectively present individual slides of the slide presentation determined to comprise an assigned individual slide priority level equal to or higher than the assigned first selectable slide presentation priority level, and for each presented slide:

selectively present any additional content-dependent slides with assigned individual slide priority levels lower than the assigned first selectable slide presentation priority level that are determined, according to inter-slide content dependency data, to comprise a user-assigned inter-slide content dependency upon content of the presented slide.

9. The system of claim 8, where the processor is further programmed to:

selectively present, responsive to a request from the user to change the assigned first selectable slide presentation priority level to a second selectable slide presentation priority level, additional remaining slides of the slide presentation that comprise the assigned individual slide priority level equal to or higher than the second selectable slide presentation priority level, and for each presented additional remaining slide:

selectively present any additional content-dependent remaining slides with the assigned individual slide priority levels lower than the assigned first selectable slide presentation priority level that are determined, according to the inter-slide content dependency data, to comprise the user-assigned inter-slide content dependency upon content of any presented additional remaining slide.

10. The system of claim 8, where in being programmed to selectively present any additional content-dependent slides with the assigned individual slide priority levels lower than the assigned first selectable slide presentation priority level that are determined, according to the inter-slide content dependency data, to comprise the user-assigned inter-slide content dependency upon the content of the presented slide, the processor is further programmed to:

selectively present the additional content-dependent slides one of before or after the respective presented slides with the assigned individual slide priority level equal to or higher than the assigned first selectable slide presentation priority level.

11. The system of claim 8, where the processor is further programmed to:

highlight, for at least one presented slide, at least one additional content item in response to determining that the at least one content item comprises a higher assigned priority level relative to the priority level assigned to the respective presented slide.

12. The system of claim 8, where the processor is further programmed to:

determine, for at least one presented slide, that at least one additionally presented slide that comprises the user-assigned inter-slide content dependency upon the content of the presented slide comprises multi-priority content; and highlight at least one content item of the multi-priority content in response to determining that the at least one content item comprises a higher assigned priority level relative to the priority level assigned to the at least one presented slide.

13. The system of claim 8, where the processor is further programmed to:

receive a request via the input device to measure an amount of time for presentation of each slide of the slide presentation;

measure the amount of time for presentation of each slide of the slide presentation;

associate an estimated time with each slide of the slide presentation based upon the measured amount of time for presentation of each slide;

receive a request via the input device to automatically select a second selectable slide presentation priority level based upon a time value indicative of a time remaining for the slide presentation;

determine, for each selectable slide presentation priority level, an estimated total remaining time for completion of the slide presentation based upon an estimated time associated with each remaining slide associated with each of the selectable slide presentation priority levels plus an estimated time of any of the slides upon which any remaining slides are dependent; and automatically select the second selectable slide presentation priority level in accordance with the estimated total remaining time for completion of the slide presentation for each of the selectable slide presentation priority levels that approximates the time remaining for the slide presentation.

14. A computer program product comprising a computer useable storage memory including a computer readable program, where the computer readable program when executed on a computer causes the computer to:

determine, responsive to detecting an indication from a user via an input device to start a slide presentation, a first selectable slide presentation priority level assigned to the slide presentation; and selectively present individual slides of the slide presentation determined to comprise an assigned individual slide priority level equal to or higher than the assigned first selectable slide presentation priority level, and for each presented slide:

selectively present any additional content-dependent slides with assigned individual slide priority levels lower than the assigned first selectable slide presentation priority level that are determined, according to inter-slide content dependency data, to comprise a user-assigned inter-slide content dependency upon content of the presented slide.

15. The computer program product of claim 14, where the computer readable program when executed on the computer further causes the computer to:

selectively present, responsive to a request from the user to change the assigned first selectable slide presentation priority level to a second selectable slide presentation priority level, additional remaining slides of the slide presentation that comprise the assigned individual slide priority level equal to or higher than the second selectable slide presentation priority level, and for each presented additional remaining slide:

selectively present any additional content-dependent remaining slides with the assigned individual slide priority levels lower than the assigned first selectable slide presentation priority level that are determined, according to the inter-slide content dependency data, to comprise the user-assigned inter-slide content dependency upon content of any presented additional remaining slide.

16. The computer program product of claim 14, where in causing the computer to selectively present any additional content-dependent slides with the assigned individual slide priority levels lower than the assigned first selectable slide presentation priority level that are determined, according to the inter-slide content dependency data, to comprise the user-assigned inter-slide content dependency upon the content of the presented slide, the computer readable program when executed on the computer causes the computer to:

selectively present the additional content-dependent slides one of before or after the respective presented slides with the assigned individual slide priority level equal to or higher than the assigned first selectable slide presentation priority level.

17. The computer program product of claim 14, where the computer readable program when executed on the computer further causes the computer to:

highlight, for at least one presented slide, at least one additional content item in response to determining that the at least one content item comprises a higher assigned priority level relative to the priority level assigned to the respective presented slide.

18. The computer program product of claim 14, where the computer readable program when executed on the computer further causes the computer to:

determine, for at least one presented slide, that at least one additionally presented slide that comprises the user-assigned inter-slide content dependency upon the content of the presented slide comprises multi-priority content; and highlight at least one content item of the multi-priority content in response to determining that the at least one content item comprises a higher assigned priority level relative to the priority level assigned to the at least one presented slide.

19. The computer program product of claim 14, where the computer readable program when executed on the computer further causes the computer to:

receive a request via the input device to measure an amount of time for presentation of each slide of the slide presentation;

measure the amount of time for presentation of each slide of the slide presentation; and associate an estimated time with each slide of the slide presentation based upon the measured amount of time for presentation of each slide.

20. The computer program product of claim 14, where the computer readable program when executed on the computer further causes the computer to:

receive a request via the input device to automatically select a second selectable slide presentation priority level based upon a time value indicative of a time remaining for the slide presentation;

determine, for each selectable slide presentation priority level, an estimated total remaining time for completion of the slide presentation based upon an estimated time associated with each remaining slide associated with each of the selectable slide presentation priority levels plus an estimated time of any of the slides upon which any remaining slides are dependent; and automatically select the second selectable slide presentation priority level in accordance with the estimated total remaining time for completion of the slide presentation for each of the selectable slide presentation priority levels that approximates the time remaining for the slide presentation.

* * * * *